United States Patent
Bochow et al.

Patent Number: 5,449,552
Date of Patent: Sep. 12, 1995

[54] WHITE OPAQUE BARRIER LAYER FILM WITH EXCELLENT LAY-FLAT PROPERTIES

[75] Inventors: Richarda Bochow, Fallingbostel; Heiko Tamke, Walsrode; Karl Hammerschmidt, Walsrode, all of Germany

[73] Assignee: Wolff Walsrode Aktiengesellschaft, Walsrode, Germany

[21] Appl. No.: 204,838

[22] Filed: Mar. 1, 1994

[30] Foreign Application Priority Data

Mar. 5, 1993 [DE] Germany .................. 43 06 963.0

[51] Int. Cl.⁶ .............................................. B32B 5/16
[52] U.S. Cl. ................................. 428/323; 428/36.7; 428/349; 428/480; 428/516; 428/520; 428/910
[58] Field of Search ............... 428/510, 349, 323, 516, 428/520, 480, 36.7

[56] References Cited

U.S. PATENT DOCUMENTS 4,698,261 10/1987 Bothe et al. .................... 428/516

FOREIGN PATENT DOCUMENTS 0208075 1/1987 European Pat. Off. .
0258020 3/1988 European Pat. Off. .
0388086 9/1990 European Pat. Off. .
3624543 1/1988 Germany .

Primary Examiner—Edith Buffalow
Attorney, Agent, or Firm—Sprung, Horn Kramer & Woods

[57] ABSTRACT

The invention relates to a multilayer composite film consisting of a surface layer A, a gas barrier layer C, a heat sealing layer D and, optionally, adhesive or coupling layers B, the individual layers being arranged as follows in the composite film:

A a biaxially stretched, white opaque polypropylene film,

B an adhesive or coupling layer,

C a gas barrier layer with a permeability to oxygen of at most 30 Ncm³/m² d bar (23° C./0% relative humidity), B an adhesive or coupling layer, D a heat sealing layer, layers A and C optionally being interchangeable.

12 Claims, No Drawings

WHITE OPAQUE BARRIER LAYER FILM WITH EXCELLENT LAY-FLAT PROPERTIES

This invention relates to a white opaque composite film which combines a high degree of whiteness, good hiding power and a high barrier effect against water vapor and gases with particularly good lay-flat properties.

The use of multilayer composite films for packaging particularly sensitive products, for example foods, which can be affected by oxidation has long been known. Products such as these are normally packed in vacuo or in an inert gas atmosphere. For this particular application, therefore, the packaging material has to be correspondingly gas-tight.

It is known that composite films comprising an aluminum layer, a PVDC lacquer or a polyamide outer layer can be used for this purpose. These films can break on flexing or tend to curl on absorbing moisture.

Where white packaging films are used for optical reasons, it is standard practice to incorporate a white pigment in or to apply white printing ink to one or more film layers or to use white, opaque biaxially stretched polypropylene films. A higher degree of whiteness can be obtained by providing a dark background in the form of metallization, an aluminum foil or a colored layer. Laminates such as this are thus white on one side only. A corresponding composite film of a metallized polyester film and a white opaque polypropylene film is known from EP 0 199 288 B1. This film has good barrier properties and good lay-flat properties, but is not suitable for packs requiring seams of high strength and, in addition, has only one white side.

In the food industry, however, there is a need for metal-free composite films which are white on both sides with a good barrier effect and which ensure that packs made from them permanently retain their shape on presentation.

Accordingly, the problem addressed by the present invention was to provide an improved composite film which would have
a high degree of whiteness and high hiding power, good barrier properties against water vapor and gases, good lay-flat properties, even under varying ambient conditions,
a high degree of stiffness and limited thermoformability.

According to the invention, this problem has been solved by the production of a composite film which is characterized in that it essentially comprises the following layers in the order listed:
A a biaxially stretched, white opaque polypropylene film,
B an adhesive or coupling layer,
C a gas barrier layer with a permeability to oxygen of at most 30 Ncm$^3$/m$^2$ d bar (23° C./0% relative humidity),
B an adhesive or coupling layer,
D a heat sealing layer,
layers A and C optionally being interchangeable.

The biaxially stretched white opaque polypropylene film A is preferably a three-layer to five-layer film. The core layer of this film consists of a polypropylene homopolymer in which vacuoles leading to an opaque appearance are formed by organic or inorganic filler during the stretching process. The outer layers preferably consist of a polypropylene copolymer. Layers of polypropylene pigmented with titanium dioxide are optionally present between the core layer and the sealing layers.

The barrier film C consists, for example, of polyamide (PA), polyvinyl alcohol (PVOH), ethylene/vinyl alcohol copolymer (EVOH), polyethylene terephthalate (PETP) or polypropylene (PP) and is optionally provided with a barrier layer lacquer or vacuum-evaporated transparent barrier layer. The gas barrier film preferably consists of polyamide (PA), polyvinyl alcohol (PVOH) or ethylene/vinyl alcohol copolymer (EVOH) or of a combination of PA and EVOH layers or of mixtures of PA and EVOH and is at least monoaxially stretched.

The heat sealing layer D consists of a polyolefin or an amorphous polyester.

Particularly preferred polyolefins are polyethylene homopolymers and polyethylene copolymers, for example
LLDPE=linear low-density polyethylene
PB=polybutylene
EVA=ethylene/vinyl acetate
EBA=ethylene/butyl acrylate
EAA=ethylene/acrylic acid
EEA=ethylene/ethyl acrylate
EMAA=ethylene/methacrylic acid
I=ionomer
and mixtures or co-extrudates of these homopolymers and copolymers.

Particularly preferred polyesters are polyethylene terephthalate homopolymers or copolymers which have a low tendency to crystallise. The tendency of polyethylene terephthalate to crystallise is decreased for example by copolymerisation of comohomers such as isophthalic acid or 1,4-cyclohexanedimethanol (CHDM).

Further materials which are preferably used for the heat-sealing layer are amorphous, impact-modified materials which consist predominantly of polyethylene terephthalate homopolymers or copolymers and which are distinguished by the fact that the secant modulus of films of this material is no higher than 1800 N/mm$^2$.

The heat sealing layer either seals firmly or is designed to be peeled off against a second film.

In one preferred embodiment, films A, C and D mentioned above are joined to their adjacent layers by an adhesive layer B. A reactive adhesive, for example a one-component or two-component polyurethane adhesive, or a polyolefin coupling agent, for example polyethylene homopolymer, EAA or EMAA, is used for the adhesive layer.

Two layers may even be joined without an adhesive layer, for example by extrusion coating of the middle layer with a heat sealing layer.

The individual layers preferably have the following thicknesses:
layer A: 25–75 μm
layer B: 0.1–20 μm
layer C: 10–30 μm
layer D: 15–150 μm.

The individual layers of the composite film may be provided with standard additives and auxiliaries, for example lubricants, antiblocking agents, antistatic agents, TiO$_2$ and CaCO$_3$.

It has surprisingly been found that, by virtue of the particular structure of the described film, printing on the barrier layer C has a particularly high degree of whiteness. The printing can thus be read through the sealing layer D. In addition, the high hiding power of film A enables the outside of the composite film to be printed, leaving any printing on the back of the film unaffected.

In addition, the possibly moisture-sensitive barrier film C is protected against moisture absorption by the outer film A and the inner film D which have a good water vapor barrier effect. In this way, the good oxygen barrier effect of this film remains unaffected by the ambient conditions.

In addition, this special film arrangement eliminates any tendency towards curling by swelling of the possibly moisture-sensitive layer C and provides the composite with a high degree of stiffness.

Surprisingly, the composite film according to the invention can be thermoformed in standard automatic machines without any effect on its whiteness.

Methods of measurement

The properties of the multilayer film according to the present invention are determined by the following methods:

The oxygen permeability of the films is determined in accordance with DIN 53 380, Part 3.

The permeability to water vapour of the films is determined in accordance with DIN 53 122.

The degree of whiteness of the films is determined by the Berger method and is defined as:

Berger degree of whiteness = $R_y + 3R_z - 3R_x$, in which $R_x$, $R_z$ and $R_y$ denote the reflection values for the various standard colours. The measurements were carried out using an ElrephoMat DFC 5 device manufactured by Zeiss/Oberkochen.

Examples

Example 1

A composite film according to the invention has the following layer structure:

Layer A (outer layer): biaxially stretched, white opaque polypropylene film, five layers, 40 μm Layer B1: two-component polyurethane adhesive, 2 μm Layer C: gas barrier layer of co-extrudate, polyamide 6/ethylene-vinyl alcohol copolymer/polyamide 6, monoaxially stretched, 15 μm counter-printed Layer B2: two- component polyurethane adhesive, 2 μm Layer D (inner layer): sealing layer of ethylene/vinyl acetate copolymer, 3.5% vinyl acetate, 75 μm Layer A consists of a core layer of polypropylene homopolymer and 15% by weight CaCO3, two layers of PP homopolymer containing 10% by weight TiO2 and two outer layers of a propylene/ethylene copolymer (ethylene content approx. 4% by weight).

Example 2

Layer A (outer layer ): biaxially stretched, white opaque polypropylene film, five layers, 40 μm, face-printed Layer B1: two-component polyurethane adhesive, 2 μm Layer C: gas barrier layer of co-extrudate, polyamide 6/ethylene-vinyl alcohol copolymer/polyamide 6, monoaxially stretched, 15 μm counter-printed Layer B2: two-component polyurethane adhesive, 2 μm Layer D (inner layer): sealing layer of co-extrudate, polyethylene homopolymer/blend of a polyethylene homopolymer and polybutylene, 50 μm, peelable from a second film

Example 3

Layer A (outer layer): biaxially stretched, white opaque polypropylene film, five layers 40 μm, face-printed between the layers Layer B1 two-component polyurethane adhesive, 2 μm Layer C: gas barrier layer of polyvinyl alcohol, biaxially stretched, 12 μm, of type Bovlon EX from Nippon Gohsei, Japan Layer B2: extrusion primer based on polyimine, 0.1 μm Layer D (inner layer): sealing layer of polyethylene homopolymer, 40 μm

Example 4

Layer A (outer layer): biaxially stretched, white opaque polypropylene film, 5 layers, 40 μm Layer B1: two-component polyurethane adhesive, 2 μm Layer C: gas barrier layer of polyvinyl alcohol, biaxially stretched, 12 μm, of type Bovlon EX from Nippon Gohsei, Japan Layer B2: two-component polyurethane adhesive, 2 μm Layer D (inner layer): sealing layer of amorphous polyethylene terephthalate 20 μm, impact-modified, of type Selar PT 4234 from Du Pont de Nemours.

Comparison example 1:

Layer A (outer layer): biaxially stretched poly-ethylene terephthalate film, 12 μm, counter-printed Layer B1: two-component polyurethane adhesive, 2 μm Layer C: barrier layer of aluminum film, 9 μm Layer B2: two-component polyurethane adhesive, 2 μm Layer D (inner layer): sealing layer of polyethylene homopolymer, 70 μm Comparison example 2:

Layer A (outer layer): barrier layer of cellophane XS, 22 μm, coated with PVDC on both sides, counter-printed Layer B: two-component polyurethane adhesive, 2 μm Layer D (inner layer): sealing layer of polyethylene homopolymer, 60 μm, dyed white Comparison of the properties of various composite films (Example 1 to 4 and comparison examples 1 and 2)

|  | Example 1 | Example 2 | Example 3 | Example 4 | Comparison Example 1 | Comparison Example 2 |
| --- | --- | --- | --- | --- | --- | --- |
| Layer A | BOPP opaque | BOPP opaque, face-printed | BOPP opaque, face-printed | BOPP opaque | PETP counter-printed | cellophane XS, counter-printed |

-continued

Comparison of the properties of various composite films
(Example 1 to 4 and comparison examples 1 and 2)

|  | Example 1 | Example 2 | Example 3 | Example 4 | Comparison Example 1 | Comparison Example 2 |
|---|---|---|---|---|---|---|
|  |  |  | between layers |  |  |  |
| Layer B1 | 2-component Polyurethane adhesive | 2-component Polyurethane adhesive | 2-component Polyurethane adhesive | 2-component Polyurethane adhesive | 2-component Polyurethane adhesive | 2-component Polyurethane adhesive |
| Layer C | PA6/EVOH/ PA6, monoaxially stretched counter-printed | PA6/EVOH/ PA6, monoaxially stretched, counter-printed | PVOH biaxially stretched | PVOH, biaxially stretched | aluminium |  |
| Layer B2 | 2-component Polyurethane adhesive | 2-component Polyurethane adhesive | Polyimine primer | 2-component Polyurethane adhesive | 2-component Polyurethane adhesive |  |
| Layer D | EVA-copolymer | peelable from LDPE | LDPE | PETP, impact modified | LDPE | LDPE, dyed white |
| oxygen permeability (23° C., 0% relative humidity) | 1.5 cm$^3$/(m$^2$d bar) | 1.5 cm$^3$/(m$^2$d bar) | <1.0 cm$^3$/(m$^2$d bar) | <1.0 cm$^3$/(m$^2$d bar) | undetectably low | 8.0 cm$^3$/(m$^2$d bar) |
| permeability to water vapour (23° C., 85% relative humidity) | <1.0 g/(m$^2$d) | <1.0 g/(m$^2$d) | <1.0 g/(m$^2$d) | 1.2 g/(m$^2$d) | undetectably low | 1.0 g/(m$^2$d) |
| Berger degrees of whiteness | 79% (measured through EVA) | 81% (measured on opaque BOPP) | 80% (measured through LDPE) | 81% (measured on opaque BOPP) | 71% (measured through PETP on printing colour) | 68% (measured through cellophane on printing colour |

The abbreviations used in the table of the components of the composite are explained by the specifications in the proceding examples.

We claim:

1. A multilayer composite film consisting essentially of a surface layer A, a gas barrier layer C, a heat sealing layer D and, optionally, adhesive or coupling layers B, wherein the individual layers are arranged as follows in the composite film:
   A a biaxially stretched, white opaque polypropylene film in which vacuoles leading to an opaque appearance is formed by organic or inorganic fillers during stretching,
   B an adhesive or coupling layer,
   C a gas barrier layer with a permeability to oxygen of at most 30 Ncm$^3$/m$^2$ d bar (23° C./0% relative humidity),
   B an adhesive or coupling layer,
   D a heat sealing layer,
   layers A and C optionally being interchangeable.

2. A multilayer composite film as claimed in claim 1, wherein the surface layer A is a biaxially stretched, white opaque polypropylene film with at least three layers.

3. A multilayer composite film as claimed in claim 1, wherein the gas barrier film C consists essentially of a polymer selected from the group consisting of polyamide, polyvinyl alcohol, ethylene/vinyl alcohol copolymer, polyethylene terephthalate and polypropylene, and is optionally provided with a barrier layer lacquer or vacuum-evaporated transparent barrier layer.

4. A multilayer composite film as claimed in claim 3, wherein the gas barrier film comprises a polymer selected from the group consisting of polyamide (PA), polyvinyl alcohol (PVOH), ethylene/vinyl alcohol copolymer (EVOH), a combination of PA and EVOH layers and a mixture of PA and EVOH and wherein the barrier film is at least monoaxially stretched.

5. A multilayer composite film as claimed in claim 1, wherein the heat-sealing layer D comprises a polymer selected from the group consisting of a polyolefin homopolymer, a polyolefin copolymer, a mixture or coextrudate of at least two members selected from the group consisting of the polyolefin homopolymer and copolymers, and the amorphous polyethylene terephthalate homopolymers and copolymers.

6. A multilayer composite film as claimed in claim 1, wherein the heat-sealing layer is produced from an amorphous, impact-modified material selected from the group consisting of the polyethylene terephthalate homopolymers and copolymers, which material is distinguished by the fact that the secant modulus of films of this material is no higher than 1800 N/mm$^2$.

7. A multilayer composite film as claimed in claim 5, wherein the heat sealing layer seals firmly or is designed to be peeled off against a second film.

8. A multilayer composite film as claimed in claim 1, wherein the films A, C and D are joined to their adjacent layers by an adhesive layer selected from the group consisting of two-component polyurethane adhesives and polyolefin coupling agents.

9. A multilayer composite film as claimed in claim 8, wherein the heat sealing layer D is joined to the adjacent layer without an adhesive layer by extrusion coating.

10. A multilayer composite film as claimed in claims 1, wherein the composite film is printed.

11. A multilayer composite film as claimed in claim 6, wherein the heat sealing layer seals firmly or is designed to be peeled off against a second film.

12. A food packaged in a multilayer composite film according to claim 1.

* * * * *